United States Patent [19]

Demeyere

[11] Patent Number: 4,735,192

[45] Date of Patent: Apr. 5, 1988

[54] PRESSURE COOKER

[76] Inventor: Maurits E. Demeyere, Morckhovenlei 40, B - 2200 Borgerhout, Belgium

[21] Appl. No.: 852,201

[22] Filed: Apr. 15, 1986

[30] Foreign Application Priority Data

Apr. 18, 1985 [BE] Belgium .................................. 60669

[51] Int. Cl.⁴ ............................................. A47J 27/00
[52] U.S. Cl. .................................... 126/389; 126/377; 220/316
[58] Field of Search ................ 126/377, 389; 220/316, 220/361, 366, 373, 203, 209

[56] References Cited

U.S. PATENT DOCUMENTS

| | | | |
|---|---|---|---|
| 4,251,007 | 2/1981 | Behnisch | 220/316 |
| 4,396,130 | 8/1983 | Robinson | 220/316 |
| 4,541,543 | 9/1985 | Elexpuru | 220/316 |

FOREIGN PATENT DOCUMENTS

| | | | |
|---|---|---|---|
| 851721 | 6/1977 | Belgium . | |
| 1076922 | 3/1960 | Fed. Rep. of Germany . | |
| 2646937 | 4/1978 | Fed. Rep. of Germany | 220/316 |
| 2367463 | 5/1978 | France . | |
| 6912046 | 2/1970 | Netherlands . | |

Primary Examiner—Randall L. Green
Attorney, Agent, or Firm—Stevens, Davis, Miller & Mosher

[57] ABSTRACT

A cover is secured in closed position on a pan by means of a closure. A seal element is mounted between seats formed by part of the cover and part of the pan. A pin to which connects a knob is movably mounted in an upper handle mounted on the cover and may presh away said seal element from its seats. The cover is provided with a steam-discharge opening which lies on the outer side of said seats while the upper handle is provided with a channel which connects to said opening and opens above the cover with an end directed towards the cover center. Part of the steam can also escape downwards between the upper handle and a lower handle mounted on the pan.

1 Claim, 3 Drawing Sheets

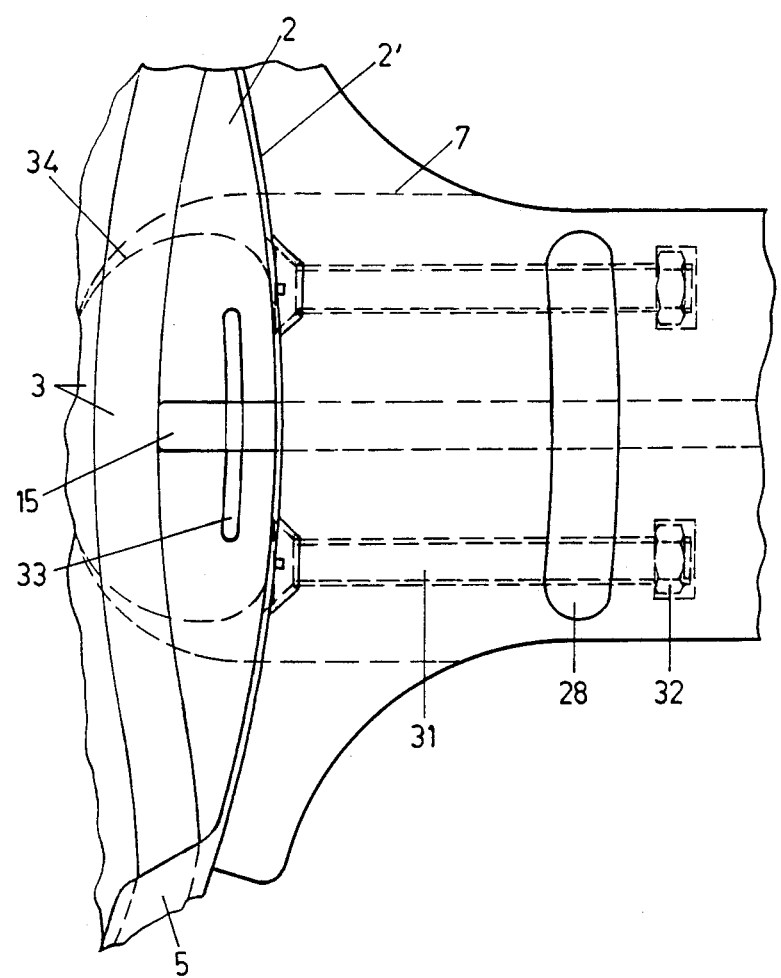

PRESSURE COOKER

BACKGROUND OF THE INVENTION

The invention relates to a pressure cooker which comprises:
a pan,
a cover which comprises a round section and a downward-directed rim around said round section,
a closure with on the one hand parts on the pan, and on the other hand parts on the cover, to secure the cover in closed position on the pan, without preventing in this position, steam escaping between said pan and cover,
a lower handle which is fast to the pan,
an upper handle which is fast to the cover, which extends over the downward-directed rim and a portion from the round section, and in closed position of said cover, lies accurately over the lower handle,
a seal element between said pan and cover, seal element wherefor part of the cover forms a seat and part of the pan forms a seat, and
mechanical means for pressing said seal element away from the seats thereof, which means are mounted in the upper handle and comprise in turn
a pin which is so mounted as to be movable along the lengthwise direction thereof in the upper handle and has an end which in one pin position, pushes through an opening in the downward-directed rim of the cover, the seal element away, and
an operating knob which is connected to said pin, which pressure cooker is provided with a vent between the lower handle and the closed cover, for steam which escapes between the pan and the downward-directed rim of the cover.

A pressure cooker of this kind is disclosed in Belgian Patent No. 851,721 in the name of the Applicant.

In this pressure cooker, the closure is a bayonet closure with lips on the cover and lips on the pan. In closed position, the cover lips come to lie accurately underneath the pan lips, in such a way that said lips retain with a maximum surface area the cover on the pan, against the action of the pressure prevailing inside the pan. Due to the overpressure which is generated inside the pressure cooker during the cooking, the seal element is pressed against the seats thereof and closes tightly the slit between cover and pan. Before being able to remove the cover after the cooking, the overpressure must be released from the pressure cooker. Such release occurs by displacing by means of the operating knob, the pin mounted in the upper handle in such a way that said pin pushes the seal element away from the seats thereof. Steam may thereby escape between said seal element and on the one hand the cover, and on the other hand the pan.

All said steam reaches the space between the lower handle top surface and on the one hand the cover rim projecting outside the pan, and on the other hand the upper handle.

Said steam which is led downwards and escapes between the upper handle and the lower handle, can also burn the individual who holds the pressure cooker handles.

To limit such danger, it is known from Belgian Patent No. 851,721, to provide the lower side of the upper handle, at a small distance from the cover, with a rib which fits inside a groove in the top side of the lower handle. The steam is deflected sidewise with said rib, to the pan's outer side.

Since all the steam escapes downwards, the steam is still not completely precluded from contacting the hand of someone holding the handles notwithstanding the rib and groove.

THE INVENTION

The invention has for object to provide a pressure cooker of the above-defined type which is still even safer and whereby the danger that steam reaches the hand of someone holding the handles, is still smaller.

For this purpose, the cover is provided with a steam-discharge opening which lies on the outer side of that cover portion which forms a seat for the seal element, adjacent the opening for the pin end, and the upper handle is provided with a channel which connects on the one hand to said steam-discharge opening, and opens on the other hand above the cover, which channel has above the cover, an end which is directed in the direction of the cover center.

When the seal element lies in sealing position, that is in the position whereby said element engages the seats thereof and seals tightly the opening between said cover and pan, said seal element also seals off the steam-discharge opening in the cover relative to the outer side of said pressure cooker.

When the pin pushes the seal element away from the seats thereof and the steam may escape between said seal element and on the one hand the cover, and on the other hand the pan, said steam can escape downwards under said downward-directed rim in the above-defined way, but a great part of said steam can also escape through the steam-discharge opening and the channel in the upper handle.

That part of the steam which escapes through the channel, is directed to the cover center and can thereby certainly not reach the hand of someone holding the handles. As markedly less steam now escapes downwards, than when the steam-discharge opening were not provided, the danger of said steam escaping downwards reaching the hand of the user, is also minimal.

FURTHER BACKGROUND OF THE INVENTION

A pressure cooker the cover of which is provided adjacent the downward-directed rim thereof, with a steam-discharge opening, is known as such from Netherlands Patent Application No. 69-12046. The upper handle in this known pressure cooker is not provided with a channel which opens with one end thereof on the cover top side. All the steam which escapes from the pressure cooker when the seal element is pushed away from the seats thereof, is led downwards and flows outwards between the upper handle and the lower handle as in the pressure cooker according to Belgian Patent No. 851,721.

Moreover, in said pressure cooker according to the Netherlands Patent Application, no specific opening is provided in the cover downward-directed rim, for the means for pushing the seal element away from the seats thereof. Said means comprise a lever the one end of which has to act through the steam-discharge opening, on the seal element. Steam can flow along the lever which is to be operated by the user, which increases the danger that steam reaches the user's hand.

In the pressure cooker as disclosed in French Patent publication No. 2,367,463 also, the cover is provided with a steam-discharge opening which is closed by the seal element in the sealing position thereof. When said seal element is pushed by mechanical means away from the seat thereof, steam can escape through said steam-discharge opening. Said steam is led partly downwards and partly upwards, but the upper handle has no channel the end of which is directed above the cover towards the cover center.

The steam escape always occurs through that opening wherein the operating knob, which is part of the mechanical means for pushing the seal element away from the one seat thereof is mounted. Said operating knob acts on the seal element by means of a part which extends through the steam-discharge opening itself as in the pressure cooker according to the above-disclosed Netherlands Patent Application No. 69-12046.

Not only part of said steam-discharge opening is closed by the operating knob, but the seal element may be pushed away but from the seat thereof on the cover and not from the seat thereof on the pan. All the steam has to escape through a steam-discharge opening which is already partly closed by the operating knob. Even if part of the steam escapes downwards, an important part of the steam escapes upwards through a channel which is integral with the recess for the operating knob. Not only said channel opens directly next to the operating knob on the top side of the upper handle, but as the steam-discharge opening necessarily opens on the recess for the operating knob, steam also flows around said operating knob which lies naturally with some play in the recess. Because the user has precisely to press the operating knob to push the seal element away from the seats, the danger that his hand might contact the escaping steam, is very high.

With the pressure cooker according to the invention, the steam-discharge opening is completely independent from the opening for the mechanical means for pushing the seal element away from said seats. Said opening opens up on a channel the end of which is directed to the cover center. Said latter means further comprise a pin and an operating knob connected thereto which knob lies at a much longer distance from the steam-discharge opening than the knob in the pressure cooker according to French Patent Application No. 2,367,463. As the operating knob does not have to act directly on the seal element, said knob may also easily form a safety device as described in said Belgian Patent No. 851,721, whereby the displacement of the upper handle relative to the lower handle and thus opening said cover is impossible without first so moving the pin that it pushes the seal element away from the seats thereof.

THE INVENTION

In a remarkable embodiment of the invention, the lower handle lies a short distance away from the downward-directed rim of the cover when said cover lies in closed position.

In a preferred embodiment of the invention, the upper handle has a bottom surface and a rib standing thereon, and the lower handle has an upper surface which is provided with a groove wherein the rib fits.

Usefully said rib and groove extend over a portion of a ring the center of which coincides with the pan center.

Other features and advantages of the invention will stand out from the following description of a pressure cooker according to the invention; this description is only given by way of example and does not limit the invention; the reference numerals pertain to the accompanying drawings.

DRAWINGS

FIG. 5 is a bottom view of that upper handle part and that cover part as shown in FIG. 4, but drawn to a larger scale.

In the five figures, the same reference numerals pertain to the same elements.

DESCRIPTION OF A PREFERRED EMBODIMENT

Figure 1:
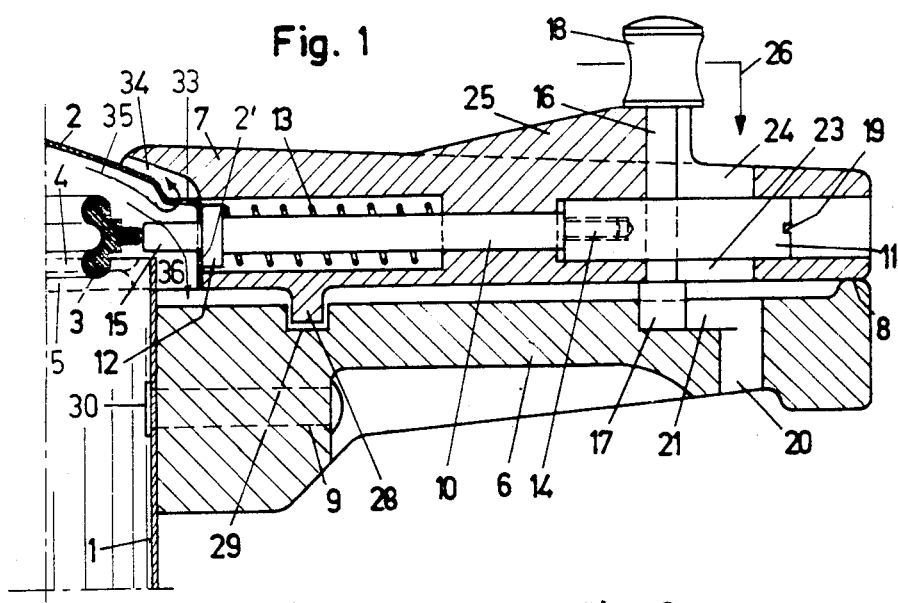
FIG. 1 is a vertical cross-section through part of the pressure cooker according to the invention, while the closure lies in closed position but the seal element is pushed away from the seats thereof, and the cover is rotatable relative to the pan.
Figure 3:
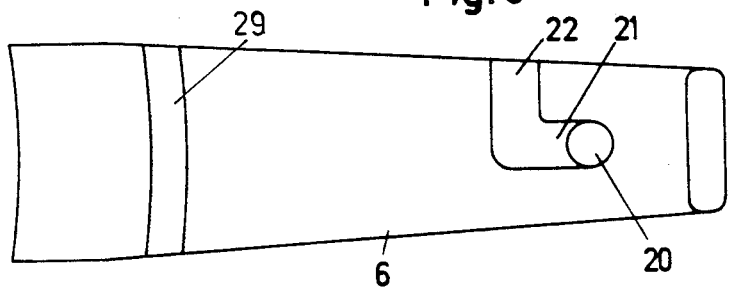
FIG. 3 is a top view of the lower handle from the pressure cooker as shown in the preceding figures.

The pressure cooker as shown in the figures is mainly comprised of the pan proper 1 and the cover 2. The cover 2 has a round section and a downward-directed rim 2' around said round section. When cooking, the cover 2 closes air-tightly the pan 1. For this purpose, as it appears from FIG. 2, a rubber seal ring 3 lies between a seat in pan 1 and a seat in cover 2. Said cover 2 is then retained on pan 1 by a bayonet closure with lips 4 on pan 1, and lips 5 on cover 2.

When the closure lies completely in closed position, the lips 5 from cover 2 come to lie completely underneath the lips 4 from pan 1. During cooking, there is generated inside pan 1, a substantial overpressure. Said overpressure would press the cover 2 away from pan 1, should said lips 5 not be retained by said lips 4. It is thus of importance that said lips 5 and lips 4 have an engagement surface area which is as large as possible. Such maximized engagement surface area is present but when the bayonet closure lies in the completely-closed position.

A lower handle 6 is secured to pan 1 by two rivets 30 which partly traverse channels 9 cut out in said lower handle 6. An upper handle 7 is secured to said cover 2 by two screw-bolts 31 and nuts 32 screwed thereon. When the bayonet closure lies in the completely-closed position, the upper handle 7 on cover 2 lies accurately over lower handle 6 on pan 1. A rib 8 provided on the top surface of lower handle 6, then presses against the bottom surface of upper handle 7.

An overpressure may be generated or retained inside pan 1 solely when said closure lies in the completely-closed position and upper handle 7 lies accurately over lower handle 6. The below-described safety means prevent an overpressure being generated inside pan 1 when said closure does not lie in the completely-closed position, and prevent that closure from being moved away from such completely-closed position while an overpressure still prevails inside the pan.

The safety means are mainly comprised of a pin which pushes or retains the seal ring 3 automatically away from the seats thereof when the cover 2 is moved away from the closed position relative to pan 1, or has not yet reached such closed position.

The pin is comprised of a peg 10 and a cylinder 11. Said peg 10 is screwed with a threaded end 14, in cylinder 11, in such a way that after assembly thereof, said peg 10 and cylinder 11 form a single unit, namely the pin.

Said peg 10 and cylinder 11 lie inside channels which extend along the lengthwise direction of upper handle 7. Said pin 10-11 is thus slidable along the lengthwise direction of upper handle 7.

The pin movement is limited in the direction of cover 2 by a collar 12 of peg 10, which engages the rim 2' of cover 2. That end 15 of peg 10 which lies on the cover side past collar 12, traverses an opening which is cut out in the rim of cover 2.

With the pin moving in the other direction, that is thus away from the cover, the collar 12 compresses a spring 13. Said spring 13 lies about peg 10 between collar 12 and the end surface of a cylinder-shaped cavity which is cut out in upper handle 7.

The movement in said other direction, thus that direction where spring 13 is being compressed, is limited due to that pin 16 moving together with said pin 10-11 along the lengthwise direction of the upper handle 7, being pressed against those end surfaces removed from cover 2, of grooves 23 and 24. The lengthwise groove 23 is cut out in the upper handle 7, underneath the space for cylinder 11, and the lengthwise groove 24 is cut out in the upper handle 7, above the space for cylinder 11. The lengthwise grooves 23 and 24 lie accurately opposite one another. They extend along the lengthwise direction of the upper handle and the width thereof corresponds to the diameter of pin 16. Said pin 16 traverses a small channel which is cut out in cylinder 11, that is in a part of said pin 10-11. Said small channel necessarily extends in the vertical direction, as the pin 16 is guided by the superimposed lengthwise grooves 23 and 24 in the upper handle 7.

On its top end, the pin 16 has a head 17 the diameter of which corresponds to the width of the below-described small groove 21-22. On the top end of said pin 16, a knob 18 is screwed. The small groove 19 which is cut out in the end surface of cylinder 11 lying on that end thereof removed from cover 2, is only used to retain by means of a screwdriver, the cylinder 11 while peg 10 is being screwed with the threaded end 14 therof in said cylinder. Said small groove has thus no part in the operation of the safety means.

The small groove 21-22 wherein said head 17 forming the bottom end of pin 16 moves, is cut out in the top part of lower handle 6. A first portion 21 of said small groove extends along the lengthwise direction of lower handle 6. The second portion 22 of said small groove extends substantially along the crosswise direction of lower handle 6. Both portions connect to one another. The first portion has a blind end removed from the connection and consequently from pan 1. The second portion 22 opens up with the end thereof removed from the connection, on the edge of lower handle 6 whereover said upper handle 7 moves when moving the closure away from the closed position, and consequently cover 2 from pan 1.

Underneath said blind end of the first portion 21 of that small groove which guides the head 17 of pin 16, a recess 20 is cut out in lower handle 6. The diameter of said recess is somewhat larger than the diameter of head 17 of pin 16, in such a way that said head 17 may penetrate down into said recess 20.

Next to that end of the lengthwise groove 24 directed towards cover 2, an overthickness 25 is provided on the upper surface of upper handle 7. The knob 18 of pin 16 may bear on said overthickness 25.

When the cover 2 is removed from the pan 1, the pin 16 lies against the ends of said grooves 23 and 24 which lie on the side of cover 2. The knob 18 bears thereby on said overthickness 25. The pin 10-11 also lies in its end position, nearest to the cover 2. Said collar 12 engages the cover rim, and the end 15 of pin 10 pushes the seal ring 3 away from the seat thereof on cover 2. In such a position, the cover 2 is laid on the pan 1. To bring the bayonet closure to the closed position, the cover 2 is rotated on pan 1, in such a way that the cover lips 5 come to lie underneath the pan lips 4. When rotating the cover 2 on pan 1, the upper handle 7 comes over the lower handle 6. This is only possible when the peg 10 remains in the above-described position relative to the upper handle 7, as only in such relative position of pin 10-11 relative to upper handle 7, the head 17 of the bottom end of pin 16 can move inside portion 22 of said small groove. When laying the cover 2 on pan 1 and when bringing the cover 2 in closed position relative to the pan 1, the seal element 3 is thus necessarily pushed away from the seats thereof in cover 1 and pan 2, by the end 15 of pin 10-11. It is only when the closure has reached the closed position and said upper handle 7 lies accurately above lower handle 6, that the pin 16 can be slid with knob 18 along the lengthwise direction of upper handle 7, which then corresponds to the lengthwise direction of lower handle 6. The pin 16 then reaches down to against those ends removed from cover 2, of said lengthwise grooves 24 and 23. The end 15 of peg 10 is pulled out of the cover, by the sliding of pin 10-11. The seal ring 3 will engage due to the resilient force thereof, the seats thereof in pan 1 and cover 2, and an overpressure may be generated inside pan 1. The pin 16 then lies with the head 17 thereof over recess 20, and the knob 18 lies no more over overthickness 25. The pin 16 may then be pressed downwards and remain in such a position during the preparation of the food in the pan.

After preparing the food, the cover 2 cannot be moved away from the closed position relative to pan 1, as long as said pan 1 is pressurized. Indeed to rotate the cover 2 away from the closed position thereof, the pin 16 has first to be pulled upwards until the head 17 is released from recess 20. Thereafter, the pin 16 may be slid with the head 17 thereof in portion 21 of said small groove, towards pan 1 and cover 2. The pin 10-11 is naturally also displaced along the same direction. The end 15 of peg 10 presses the seal ring 3 away from the seats thereof. The seal ring seals no more. Steam escapes in that location where said seal ring is pushed away from the seats thereof. Thereafter only, the cover 2 and upper handle 7 may be rotated over the pan 1 and lower handle 6. It is only when said collar 12 engages the rim of cover 2, that head 17 lies level with said small groove portion 22 and the opening movement becomes possible. The head 17 of pin 16 thus forms an extension of pin 10-11 which is so guided in the small groove 21-22 cut out in lower handle 6, that said pin 10-11 has to push the seal ring 3 away from the seats thereof, before said pin 10-11 with upper handle 7 and cover 2 may move away from the closing position relative to said lower handle 6 and pan 1.

Before being able to bring cover 2 and upper handle 7 in the closed position, there should be imparted to knob 18 and consequently to pin 16, a movement in the 2 and upper handle 7 have to be brought in closed position relative to pan 1 and lower handle 6, the knob 18 and consequently the pin 16 have to perform the movement as shown by arrow 27. Here also the pin 10-11 naturally takes part in the horizontal motion, but not in the vertical motion.

To prevent the steam which escapes from the pan when the seal ring 3 has been pushed away from the seats thereof in pan 1 and cover 2, being directed on the hand of the individaul who holds the handles, the cover 2 is provided with an oblong steam-discharging opening 33.

Said opening 33 lies in the top side of cover 2, directly next to the bentdown rim 2' thereof and adjacent the opening in rim 2' for pin 10-11, where the pin 10-11 can push the seal ring 3 away from the seats thereof and consequently in the location of upper handle 7.

Figure 2:
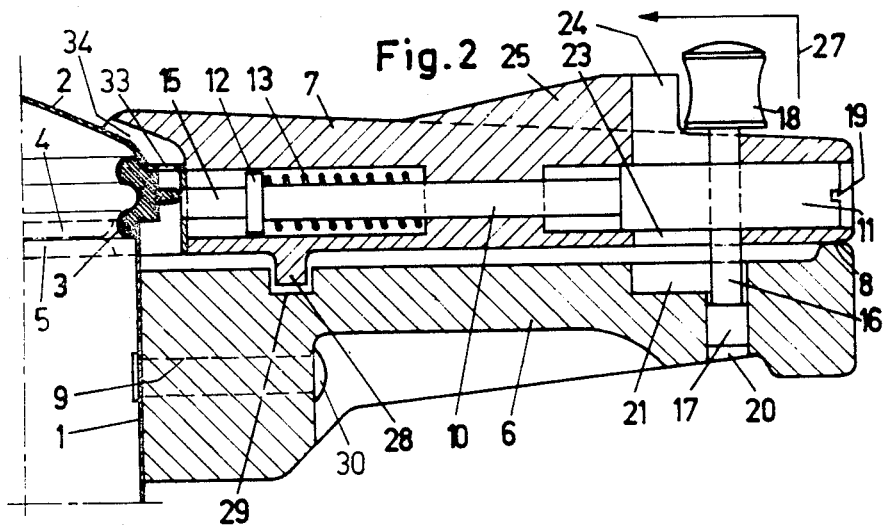
FIG. 2 is a vertical cross-section similar to FIG. 1, while the closure lies in closed position and the seal element lies in sealing position.
Figure 4:
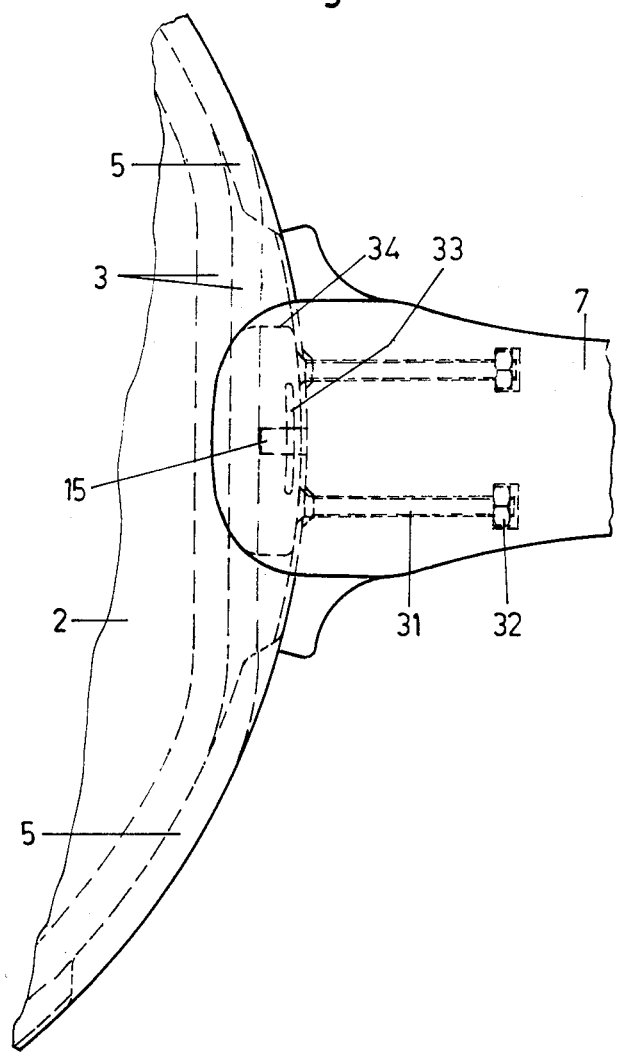
FIG. 4 is a top view of part of the upper handle from the pressure cooker as shown in FIGS. 1 and 2, whereby part of the cover is shown and a seal element is pushed away from the seats thereof by the means therefor.

When the seal ring 3 lies in the sealing position shown in FIG. 2, the opening 33 lies on the outer side relative to said seal ring 3, and said seal ring 3 completely closes off the opening 33 from the pressure cooker innerspace.

The pressurized steam which retains the seal ring 3 in said sealing position, may thus no more escape through said opening 33.

The opening 33 opens up on the space lying above cover 2. That end lying on the side of cover 2, of the upper handle 7 extends up to above the opening 33, but said end is provided on the bottom side thereof with a channel 34 which extends from above opening 33 to that extreme end facing the center of cover 2, of the upper handle 7 and which connects thus on the one hand to said opening 33 and opens on the other hand above the cover 2. The channel end above the cover 2 is directed in the direction of the cover center.

When after the cooking, the seal ring 3 is pushed away from the seats thereof by means of pin 10-11 steam can escape from the pressure cooker between said seal ring 3 and the cover 2 on the one hand, and the uppermost edge of pan 1 on the other hand.

A great part of said steam flows outwards through opening 33 and channel 34, as shown with arrow 35 in FIG. 1. Said steam reaches the space above cover 2 and is directed by that end lying above said cover 2, of the upper handle 7, upwards in the direction of the cover center.

Part of the steam also flows however through the slit between the downturned rim 2' of cover 2 and the uppermost edge of pan 1, as shown with arrow 36 in FIG. 1. Said steam part reaches the space between upper handle 7 and lower handle 6 and is guided sidewise outwards between both said handles.

Said latter part is naturally markedly smaller than the amount of steam which would escape through said path should the opening 33 not be provided in cover 2. Said latter steam part will thereby also not reach normally the hand of someone holding the handles. To be on the safe side, said latter steam part is prevented from flowing in the direction of the hand by a rib 28 arranged on the bottom surface of said upper handle 7, which fits inside a small groove 29 which is cut out in the top surface of lower handle 6. Said rib 28 and small groove 29 extend along a portion of a ring which has the pan vertical axis as geometrical axis. They do not prevent rotating of cover 2 and upper handle 7 relative to pan 1 and lower handle 6.

There should thus be clear from the above description that the pressure cooker according to the invention has simple safety means which prevent a pressure difference between the pan inner volume and the room thereabout when the closure does not lie in the closed position.

There is thus no danger that the steam which the user lets escape from the pressure cooker after the cooking and before opening the cover 2, might reach the hand of such user, which holds the handles 6 and 7 before opening said cover 2.

The invention is in no way limited to the above-described embodiment and within the scope of the patent application, many changes may be brought to the described embodiment, notably as regards the shape, the composition, the arrangement and the number of the components which are being used to embody the invention.

I claim:

1. A pressure cooker which comprises
a round pan, comprising a first closure part,
a cover which comprises a second closure part, said cover defining a round section and a downwardly directed rim around said round section, said downwardly directed rim defining an opening therethrough, said second closure part cooperating with said first closure part to secure the cover in closed position on the pan, without preventing in such position, the escape of steam between the pan and the cover,
a radially directed lower handle secured to the pan and spaced from the downwardly directed rim of the cover, when said cover lies in a closed position and having a top surface provided with an arcuate groove and a recess,
a radially directed upper handle secured to the cover and extending over the downwardly directed rim, said upper handle having a bottom surface and an arcuate rib extending therefrom, said rib fitting completely into said groove of the lower handle when said pan and cover are in a closed position,
a seal element mounted to press against said pan and said cover,
mechanical means in the upper handle for pushing said seal element away from the cover and the pan, said means comprising
a movable pin radially mounted in the upper handle having an end extending through said opening in said cover to contact said seal, and
an operating knob extending transversely through said pin and said upper handle into said recess of said lower handle when said pan and cover are in a closed position and preventing the displacement of the upper handle relative to the lower handle unless the operating knob brings said pin into a position whereby the pin pushes the seal element away from the cover and the pan,
said cover defining a steam-discharge opening adjacent the opening for the pin end, and closed by the seal element when said seal element presses against the pan and the cover,
said upper handle and cover round section defining a channel interconnecting said steam-discharge opening and an upper side of said cover, and
said pan being spaced from the downwardly directed rim of said cover to define an outlet for escaping steam when said pin end pushes said seal element away from said cover and said pan.

* * * * *